(12) United States Patent
Kawai et al.

(10) Patent No.: US 8,113,017 B2
(45) Date of Patent: Feb. 14, 2012

(54) METHOD FOR CLEANING A GLASS SUBSTRATE, METHOD FOR FABRICATING A GLASS SUBSTRATE, AND MAGNETIC DISK USING SAME

(75) Inventors: Hideki Kawai, Kobe (JP); Yukitoshi Nakatsuji, Sakai (JP); Hiroaki Sawada, Sakai (JP); Shinichi Saeki, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 46 days.

(21) Appl. No.: 11/824,775

(22) Filed: Jul. 2, 2007

(65) Prior Publication Data
US 2008/0026261 A1 Jan. 31, 2008

(30) Foreign Application Priority Data
Jul. 3, 2006 (JP) ................................. 2006-183082

(51) Int. Cl.
*C03C 19/00* (2006.01)
*C03C 3/06* (2006.01)
*G11B 5/07* (2006.01)

(52) U.S. Cl. ............... 65/377; 65/29.12; 451/8; 451/41; 428/486.9; 428/848.2

(58) Field of Classification Search ............... 65/31, 88, 65/377, 29.12; 216/97, 100, 84; 451/41, 451/8, 28, 43, 44, 42; 369/275.1, 272.1; 360/215, 135; 501/9, 69, 4; 428/846.9, 847.2, 428/141, 1.1, 848.2, 848.8; 427/402, 130; 257/288; 438/5, 692
See application file for complete search history.

(56) References Cited

U.S. PATENT DOCUMENTS

| 6,553,788 | B1* | 4/2003 | Ikeda et al. ........................ 65/31 |
| 2001/0055938 | A1* | 12/2001 | Fujimura et al. ................. 451/41 |
| 2002/0016132 | A1 | 2/2002 | Isono et al. |
| 2002/0193233 | A1 | 12/2002 | Kishimoto et al. |
| 2003/0230112 | A1* | 12/2003 | Ikeda et al. ........................ 65/31 |
| 2005/0008822 | A1 | 1/2005 | Miyamoto et al. |
| 2005/0074635 | A1 | 4/2005 | Mitani et al. |
| 2005/0096210 | A1* | 5/2005 | Kawai ............................... 501/69 |
| 2005/0215414 | A1* | 9/2005 | Kawai ............................... 501/69 |
| 2006/0062129 | A1* | 3/2006 | Saito et al. .................. 369/272.1 |

(Continued)

FOREIGN PATENT DOCUMENTS
JP 2000-132829 A 5/2000
(Continued)

OTHER PUBLICATIONS
Translation (machine) Koji et al, JP 2000-311336, Nov. 2000.*
(Continued)

*Primary Examiner* — Kevin M. Bernatz
*Assistant Examiner* — Louis Falasco
(74) *Attorney, Agent, or Firm* — Brinks Hofer Gilson & Lione

(57) ABSTRACT

A method for cleaning a glass substrate which ensures removal of abrasive and other foreign matter without making a cleaning step complicated involves cleaning the glass substrate by scrubbing using two or more types of cleaning liquid having different Si element elution abilities. The cleaning liquid having the highest Si element elution is used first, and the cleaning liquid having the lowest Si element elution is used last.

4 Claims, 2 Drawing Sheets

U.S. PATENT DOCUMENTS

2007/0123046 A1*  5/2007  Ravid et al. .................. 438/692
2008/0026261 A1*  1/2008  Kawai et al. ............... 428/846.9

FOREIGN PATENT DOCUMENTS

| | | | |
|---|---|---|---|
| JP | 2000-140778 | A | 5/2000 |
| JP | 2000-311336 | | 11/2000 |
| JP | 2001-316133 | | 11/2001 |
| JP | 2001-344743 | | 12/2001 |
| JP | 2002-074653 | | 3/2002 |
| JP | 2002-329629 | | 11/2002 |
| JP | 2002-352422 | A | 12/2002 |
| JP | 2003-036566 | | 2/2003 |
| JP | 2003-146667 | | 5/2003 |
| JP | 2003-228824 | | 8/2003 |
| JP | 2003-346316 | | 12/2003 |
| JP | 2004-145958 | | 5/2004 |
| JP | 2006-119624 | A | 5/2006 |
| WO | WO 2004/042708 | A1 | 5/2004 |

OTHER PUBLICATIONS

Translastion (machine) Horoki et al, JP 2003-146667, May 2003.*
Non-final Office Action dated Jul. 9, 2009 issued in U.S. Appl. No. 11/824,770.
Final Office Action dated Mar. 25, 2010 issued in U.S. Appl. No. 11/824,770.
Non-final Office Action dated Jun. 24, 2009 issued in U.S. Appl. No. 11/824,768.
Final Office Action dated Jan. 5, 2010 issued in U.S. Appl. No. 11/824,768.
International Search Report issued in International Application No. PCT/JP2007/062868 dated Oct. 2, 2007, 4 pgs.
Japanese Office Action mailed Sep. 20, 2011 (3 pages) (no translation).

* cited by examiner

METHOD FOR CLEANING A GLASS SUBSTRATE, METHOD FOR FABRICATING A GLASS SUBSTRATE, AND MAGNETIC DISK USING SAME

This application is based on Japanese Patent Application No. 2006-183082 filed on Jul. 3, 2006, the contents of which are hereby incorporated by reference.

BACKGROUND OF THE INVENTION

1. Field of the Invention

The present invention relates to a method for cleaning a glass substrate, to a method for fabricating a glass substrate, and to a magnetic disk using a glass substrate so cleaned and fabricated. More particularly, the present invention relates to a method for cleaning a glass substrate and a method for fabricating a glass substrate in which the glass substrate is cleaned by scrubbing, and to a magnetic disk using a glass substrate so cleaned and fabricated.

2. Description of Related Art

Conventionally, as substrates for magnetic disks, there have generally been used aluminum substrates in stationary devices such as desktop computers and servers, and glass substrates in portable devices such as notebook computers and mobile computers. One disadvantage with aluminum substrates is that they are easy to deform and are not hard enough, offering not quite satisfactory smoothness on the substrate surface after polishing. Another disadvantage is that, if a magnetic head happens to touch a magnetic disk, the magnetic film (magnetic recording layer) on an aluminum substrate is prone to exfoliate from the substrate. Under this background, it is expected that glass substrates, less prone do deformation, offering better surface smoothness, and affording higher mechanical strength, will be increasingly used not only in portable but also in stationary devices and in other home information appliances.

The recording capacity of a magnetic disk can be increased by reducing the distance between the surface thereof and a magnetic head. Inconveniently, however, with a reduced distance between a magnetic head and the surface of a magnetic disk, if there is an abnormal projection formed on or foreign matter adhered to the surface of a glass substrate, the magnetic head collides with the projection or foreign matter. Thus, to make it possible to increase the recording capacity of a magnetic disk by reducing the distance from the surface thereof to a magnetic head, it is necessary to eliminate formation of projections on and adhesion of foreign matter to the surface of a glass substrate altogether. For this purpose, it is conventional practice to polish the surface of a glass substrate with abrasive such as cerium oxide to make it smooth enough.

Disadvantageously, however, polishing a glass substrate with abrasive may leave the abrasive firmly adhered to the surface thereof, and even when the glass substrate surface is thereafter cleaned by scrubbing, it is difficult to remove the abrasive firmly adhered thereto. Moreover, forming a magnetic recording layer on the glass substrate surface with the abrasive firmly adhered thereto is likely to produce pin holes in the layer, destabilize the floating characteristics of the head, and otherwise significantly degrade the magnetic recording characteristics.

As a solution, for example, JP-A-2002-074653 proposes performing, after a polishing step, three types of cleaning, namely ultrasonic cleaning using a detergent, cleaning by scrubbing, and ultrasonic cleaning using pure water. As another solution, JP-A-2003-228824 proposes cleaning a glass substrate by a combination of cleaning by scrubbing and cleaning using a water solution of carbon dioxide.

Supposedly, these conventionally proposed technologies help to a certain degree to remove the abrasive or other foreign matter adhered to a glass substrate. Disadvantageously, however, the former technology, requiring three types of cleaning, complicates the cleaning step and lowers productivity; likewise, the latter technology, requiring the introduction of equipment for maintaining and managing the solubility of the gas, complicates the cleaning step and lowers productivity.

SUMMARY OF THE INVENTION

In view of the above described problem, it is an object of the present invention to provide a method for cleaning a glass substrate, and a method for fabricating a glass substrate using such a cleaning method, that, without making a cleaning step complicated, ensures removal of abrasive and foreign matter adhered to the glass substrate after a polishing step and leaves the glass substrate after the cleaning step clean and free of residual cleaning liquid ingredients.

It is another object of the present invention to provide a magnetic disk that allows increase in recording capacity through a reduction of the distance between a magnetic head and the surface of the magnetic disk.

Through an intensive study in search of the way to achieve the above object, the inventors of the present invention have discovered that the aim is attained by using two or more types of cleaning liquid having different Si element eluting abilities in particular order and by adopting scrubbing as the method for cleaning, and this discovery has led to the present invention.

One distinctive feature of the present invention is that a method for cleaning a glass substrate involves the use of two or more types of cleaning liquid having different Si element eluting abilities, with the one having the highest Si element elution used first and the one having the lowest Si element elution used last. Using the cleaning liquid having the highest Si element elution first allows the glass substrate surface to be slightly eroded by the cleaning liquid, and thereby allows abrasive and foreign matter firmly adhered to the glass substrate surface to somewhat float; the abrasive and foreign matter, now in a somewhat floating state, are then removed by scrub-cleaning. On the other hand, using the cleaning liquid having the lowest Si element elution last helps bring the glass substrate into a stable state and keep clean the substrate surface obtained through the cleaning thus far.

Another distinctive feature of the present invention is that a glass substrate is cleaned by scrubbing. A plurality of scrub-cleaning machines may be arranged separately so that each is operated exclusively with a different type of cleaning liquid; instead, a single scrub-cleaning machine may be used while different types of cleaning liquid are switched from one to another. To simplify the cleaning step and to save space, the latter method is recommended.

Specifically, according to a first aspect of the present invention, in a method for cleaning a glass substrate by scrubbing using two or more types of cleaning liquid, among the two or more types of cleaning liquid, the one having the highest Si element elution is used first and the one having the lowest Si element elution is used last.

According to a second aspect of the present invention, the two or more types of cleaning liquid may be used in decreasing order of Si element elution.

According to a third aspect of the present invention, the cleaning may be performed using a single cleaning machine throughout.

According to a fourth aspect of the present invention, the two or more types of cleaning liquid may contain substantially the same ingredient but in different concentrations, and may be used in order of decreasing order of concentration.

According to a fifth aspect of the present invention, the cleaning liquid may be hydrofluoric acid.

According to a sixth aspect of the present invention, among the two or more types of cleaning liquid, the one used first may be alkaline or acidic and the one used last maybe weakly acidic or neutral.

According to a seventh aspect of the present invention, among the two or more types of cleaning liquid, the one used first may have a lower specific resistance than the one used last.

According to an eighth and a ninth aspect of the present invention, the two or more types of cleaning liquid may be switched from one to another continuously, or may be switched from one to another stepwise.

According to a tenth aspect of the present invention, a method for fabricating a glass substrate includes a cleaning step using the cleaning method described above.

According to an eleventh aspect of the present invention, a magnetic disk has a magnetic recording layer formed on a glass substrate fabricated by the fabrication method described above.

With the method for cleaning a glass substrate according to the present invention, the glass substrate is cleaned by scrubbing using two or more types of cleaning liquid having different Si element eluting abilities, with the one having the highest Si element elution used first and the one having the lowest Si element elution used last. This ensures, without making a cleaning step complicated, that abrasive and foreign matter adhered to the glass substrate are removed. Moreover, it is no longer necessary to use a cleaning liquid exerting a powerful cleaning effect as in cases where only one type of cleaning liquid is used. Thus, it is possible to alleviate degradation of surface roughness resulting from an excessive cleaning effect, and to alleviate the effect of residual cleaning liquid ingredients on a magnetic film.

Using the two or more types of cleaning liquid in decreasing order of Si element elution helps effectively alleviate deterioration of roughness on the substrate surface while maintaining a high cleaning effect.

Switching the different types of cleaning liquid from one to another in a single cleaning machine helps further simplify the cleaning step. In this case, switching two or more types of cleaning liquid containing substantially the same ingredient but in different concentrations from one to another in decreasing order of concentration allows the cleaning step to be performed continuously, and thus helps increase the efficiency of the cleaning step. That is, it is more preferable that the cleaning be performed using a single cleaning machine while the concentration of the cleaning liquid is gradually reduced. The switching of the cleaning liquid from one concentration to another may be continuous, or may be stepwise.

Using hydrofluoric acid, having a high Si element elution, as the cleaning liquid allows effective cleaning of the glass substrate.

Using an alkaline or acidic cleaning liquid first and a weakly acidic or neutral cleaning liquid last, or using a cleaning liquid having a lower specific resistance first and one having a higher specific resistance last, allows easy control of the electrochemical action during cleaning, and thus allows more effective cleaning of the glass substrate.

The present invention also provides a method for fabricating a glass substrate which includes a cleaning step using the cleaning method described above.

In the method for fabricating a glass substrate according to the present invention, as a result of the glass substrate being cleaned by the cleaning method described above, abrasive and foreign matter are removed from the glass substrate surface; this simplifies the cleaning step and helps increase productivity. Moreover, since there is no need for a powerful cleaning liquid, it is possible to maintain satisfactory surface smoothness, and thus to provide a high-quality surface very clean and free of residual cleaning liquid ingredients.

The magnetic disk according to the present invention has a magnetic recording layer formed on a glass substrate fabricated by the fabrication method described above. This makes it possible to reduce the distance from a magnetic head to the surface of the magnetic disk, and thus to increase the recording capacity thereof.

DETAILED DESCRIPTION OF PREFERRED EMBODIMENTS

Figure 2:
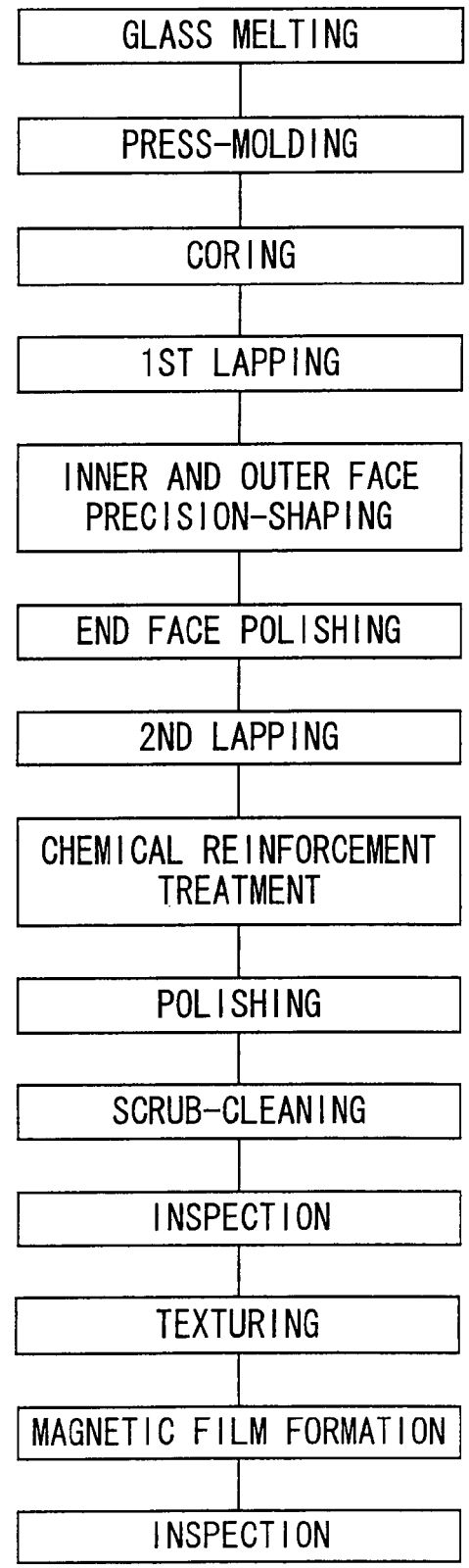
FIG. 2. is a diagram to show an example of a process for fabricating a glass substrate and a magnetic disk according to the present invention.

FIG. 2 shows an outline of, in one part, an example of a process for fabricating a glass substrate involving scrub-cleaning and, in the other part, a process for fabricating a magnetic disk using a glass substrate so fabricated. First, a glass material is melted (a glass melting step). The melted glass is then poured into a lower mold, and is then molded by being pressed with an upper mold into a disk-shaped glass substrate precursor (a press-molding step). Here, the disk-shaped glass substrate precursor may be formed, instead of by press-molding, by cutting it with an abrasive grindstone out of sheet glass formed, for example, by down-drawing or floating.

There is no particular restriction on the material of the glass substrate targeted by the cleaning method of the present invention. Examples of the material include: soda-lime glass, of which the main ingredients are silicon dioxide, sodium oxide, and calcium oxide; aluminosilicate glass, of which the main ingredients are silicon dioxide, aluminum oxide, and $R_2O$ (where R=K, Na, Li); borosilicate glass; lithium oxide-silicon dioxide glass; lithium oxide-aluminum oxide-silicon dioxide glass; R'O-aluminum oxide-silicon dioxide glass (where R'=Mg, Ca, Sr, Ba). Any of these glass materials may have zirconium oxide, titanium oxide, or the like added thereto.

There is no particular restriction on the size of the glass substrate. The method of the present invention is applicable to 2.5-inch, 1.8-inch, 1-inch, and 0.85-inch disks and even disks with smaller diameters, and to 2 mm thick, 1 mm thick, and 0.63 mm thick disks and even disks with smaller thicknesses.

As necessary, in a central portion of the press-molded glass substrate precursor, a hole is formed with a core drill or the like (a coring step). Then, in a first lapping step, the surface of the glass substrate on both sides is ground, and thereby the overall shape of the glass substrate is preliminarily adjusted in terms of the parallelism, flatness, and thickness thereof. Next, the outer and inner circumferential edge faces of the glass substrate are ground and chamfered, and thereby fine adjustments are made in the exterior dimensions and roundness of the glass substrate, the inner diameter of the hole, and the concentricity between the glass substrate and the hole (an inner and outer face precision-shaping step). Then, the outer and inner circumferential edge faces of the glass substrate are polished to remove minute scratches and the like (an end face polishing step).

Next, the surface of the glass substrate on both sides is ground again, and thereby fine adjustments are made in the parallelism, flatness, and thickness of the glass substrate (a second lapping step). Then, to improve the mechanical strength of the glass substrate, it is subjected to chemical reinforcement treatment. In the chemical reinforcement treatment here, the glass substrate is immersed in a chemical reinforcement liquid collected in a chemical reinforcement treatment vat so that the alkali metal ions on the glass substrate surface are substituted by alkali metal ions with larger ion diameters. This produces compression strain and thereby improves mechanical strength.

Next, the surface of the glass substrate on both sides is polished, and thereby the surface irregularities on the glass substrate surface are leveled. As necessary, the surface of the glass substrate on both sides may be further polished with abrasive with a different grain size. In the present invention, the step of polishing the glass substrate is achieved with a conventionally known technology as it is. To polish the glass substrate, for example, two rotatable surface plates are arranged opposite each other, and pads are attached one to each of the faces thereof that face each other; then, the glass substrate is placed between the two pads, and the surface plates are rotated with the glass substrate surface kept in contact with the pads, while abrasive is supplied to the glass substrate surface. Examples of the abrasive include: cerium oxide, zirconium oxide, aluminum oxide, manganese oxide, colloidal silica, and diamond. Among these, using cerium oxide is recommendable because it reacts well with glass and produces a smooth polished surface in a short time.

To effectively remove abrasive, foreign matter, and the like on the glass substrate surface, it is preferable that the glass substrate be kept in contact with the same liquid as the cleaning liquid described above before scrub-cleaning. There is no particular restriction on the duration of contact. To let the liquid exert a slight eroding action adequate to allow the abrasive and foreign matter firmly adhered to the glass substrate surface to somewhat float, it is preferable that the duration of contact be 10 minutes or more. On the other hand, the longer the duration of the contact of the glass substrate with the liquid, the easier the removal of the abrasive and foreign matter from the glass substrate surface, but the lower the productivity of the glass substrate. Thus, a preferable range of the duration of contact is from 5 to 30 minutes. For effective prevention of adhesion of foreign matter to the glass substrate surface, it is recommended that the glass substrate be kept in contact with the liquid until immediately before scrub-cleaning.

As the method for keeping the glass substrate surface with the liquid, any conventionally known one may be adopted. Examples of such methods include: one in which the glass substrate is immersed in the liquid collected in a container; one in which the glass substrate is sprayed with the liquid; and one in which the glass substrate is coated with cloth impregnated with the liquid. Among these, the method involving immersion of the glass substrate in the liquid is preferable because it ensures that the entire glass substrate surface is evenly kept in contact with the liquid.

Figure 1:
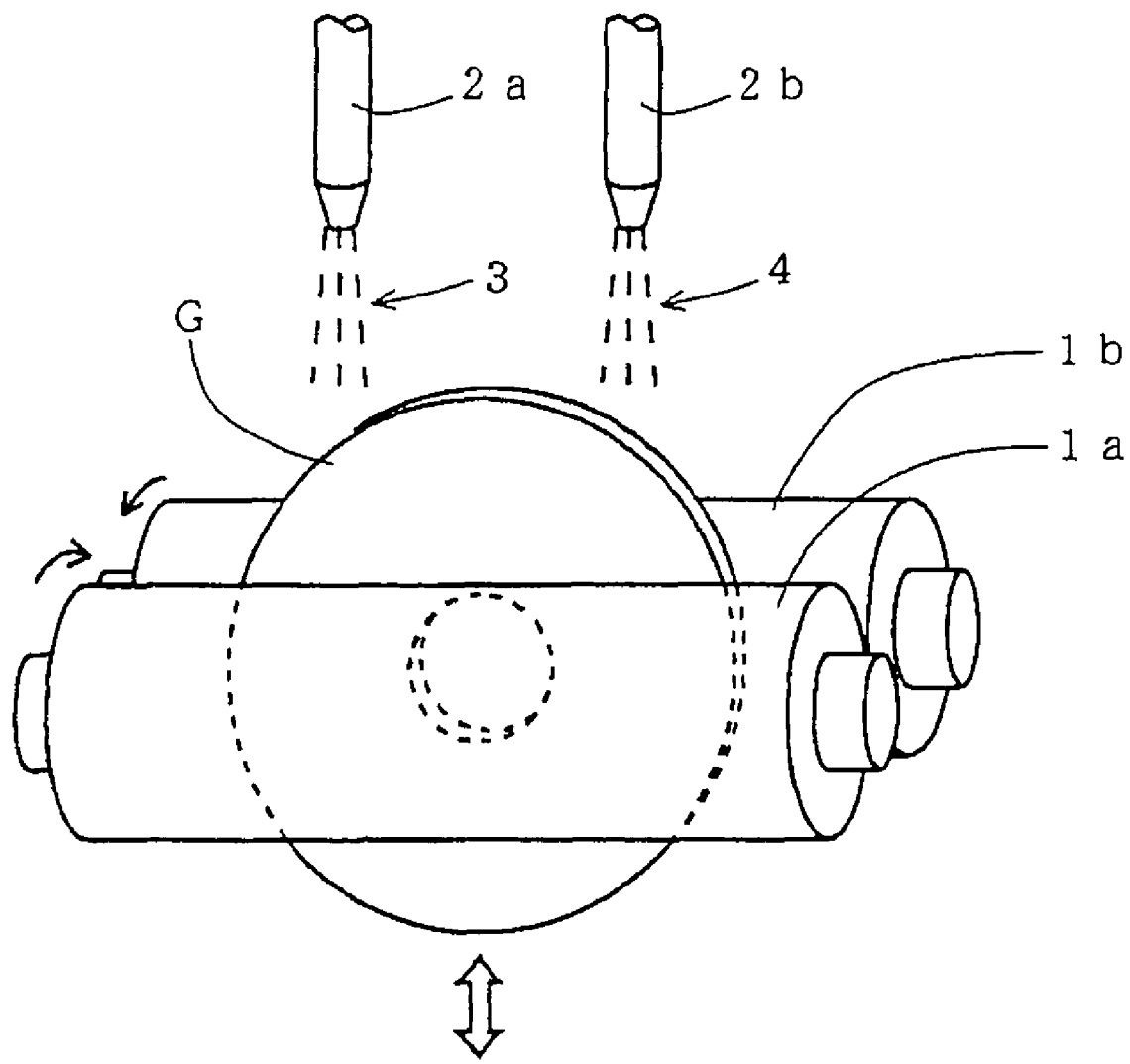
FIG. 1 is a diagram schematically to show an example of a scrub-cleaning machine.

An example of scrub-cleaning equipment is shown in FIG. 1. In the scrub-cleaning equipment shown in FIG. 1, a glass substrate G is placed at the nip between a pair of sponge rollers 1a and 1b pressed against each other, and, while a cleaning liquid 3 and pure water 4 are sprayed from nozzles 2a and 2b arranged above, the sponge rollers 1a and 1b are rotated in opposite directions relative to each other; simultaneously, the glass substrate G itself is also moved up and down. In this way, the entire surface of the glass substrate on both sides is cleaned.

Scrub-cleaning is performed under the following conditions. The two rollers 1a and 1b may be rotated at an equal rate, or at different rates as necessary. A typical range of the rotation rate of the rollers is from 10 to 500 rpm, and more preferably from 30 to 300 rpm. A typical range of the rate of movement of the glass substrate G is from 0 to 50 times per minute, and more preferably from 5 to 30 times per minute. A typical range of the feed rate of the cleaning liquid 3 is from 10 to 1000 ml per minute, and more preferably from 50 to 500 ml per minute. A typical range of the duration of scrub-cleaning is from 5 to 150 seconds, and more preferably from 10 to 100 seconds.

Needless to say, scrubbing may be achieved, instead of with sponge rollers as shown in FIG. 1, with any other members such as brushes or pads as conventionally known. Examples of the material of such scribing members include: polyvinyl alcohol, polyurethane, vinyl alcohol, polypropylene, and nylon.

Examples of the cleaning liquid used in the present invention include: hydrofluoric acid, sodium hydroxide, sodium silicate, ion water, activator-containing water, a weakly alkaline solution, a weakly acidic solution, pure water, ozone water, a neutral detergent liquid, and hydrogen peroxide water. Among these, hydrofluoric acid is particularly suitable because it has a high Si element elution. It is preferable that an alkaline or acidic cleaning liquid be used first, and that a weakly acidic or neutral cleaning liquid be used last. In a case where an alkaline cleaning liquid is used first, it is preferable that formula (1) below be fulfilled.

$$Hs>10 \text{ and } Hs/He>1.5 \tag{1}$$

where Hs represents the pH of the cleaning liquid used first, and He represents the pH of the cleaning liquid used last.

On the other hand, in a case where an acidic cleaning liquid is used first, it is preferable that formula (2) below be fulfilled.

$$Hs<5 \text{ and } Hs/He<0.6 \tag{2}$$

where Hs represents the pH of the cleaning liquid used first, and He represents the pH of the cleaning liquid used last.

It is preferable that the specific resistance of the cleaning liquid used first be lower than that of the cleaning liquid used last. Specifically, it is preferable that formula (3) below be fulfilled.

$$Rs<0.1 \text{ M}\Omega\cdot\text{cm and } Rs/Re<0.2 \tag{3}$$

where Rs represents the specific resistance of the cleaning liquid used first, and Re represents the specific resistance of the cleaning liquid used last.

In the present invention, the elution of the Si element into the liquid is measured in the following manner. First, a reference glass substrate is prepared from aluminoborosilicate glass containing $SiO_2$ as a main ingredient thereof and having the following composition: 65% by weight of $SiO_2$, 15% by weight of $Al_2O_3$, 5% by weight of $B_2O_3$, 2% by weight of $Li_2O$, 7% by weight of $Na_2O$, and 6% by weight of $K_2O$. The main surface of this substrate is polished with cerium oxide to have a surface roughness Ra of 20 Å or less, and is then cleaned, the reference glass substrate eventually having an outer diameter of 65 mm, an inner diameter of 20 mm, and a thickness of 0.635 mm. This glass substrate is immersed in 250 ml of the liquid kept at 60° C. for five hours. Then, on an ICP (inductively coupled plasma) emission spectrometer, the amount of the Si element in the elution liquid is measured. In advance, the amount of the Si element in the liquid before the immersion of the glass substrate is measured likewise so that this amount is subtracted from that measured after immersion, and, based on the result of this subtraction, the Si element elution of the liquid is calculated.

There is no particular restriction on the specific numerical range of the Si element elution of each cleaning liquid used. It is, however, preferable that the cleaning liquid used first have a Si element elution in the range from 1 to 10000 ppb/mm$^2$, and that the cleaning liquid used last have a Si element elution in the range from 0.001 to 10 ppb/mm$^2$. In cases where three or more types of cleaning liquid are used, it is preferable that they be used in decreasing order of Si element elution.

In a case where the cleaning liquid is switched from one type to another in a single scrub-cleaning machine, the switching of the cleaning liquid may be done continuously or stepwise. Continuous switching from one type of cleaning liquid to another can be achieved by, for example in the cleaning machine shown in FIG. 1, continuously varying the proportion in which the cleaning liquid 3 and the pure water 4 are sprayed from the nozzles 2a and 2b. Stepwise switching from one type of cleaning liquid to another can be achieved, for example in the cleaning machine shown in FIG. 1, by making the nozzles 2a and 2b spray different types of cleaning liquid so that the glass substrate is scrub-cleaned first with one type of cleaning liquid sprayed from the nozzle 2a and then with another type of cleaning liquid sprayed from the nozzle 2b. Where three or more types of cleaning liquid are used, as many nozzles need to be provided. Instead, separate treatment stages may be arranged within the cleaning machine so that cleaning is performed in one stage after another using a different type of cleaning liquid in each stage.

As necessary, the glass substrate that has undergone scrub-cleaning is then subjected to drying (unillustrated). Specifically, for drying, the glass substrate is immersed in IPA (isopropyl alcohol) so that cleaning liquid ingredients dissolve into IPA and that the liquid coating the substrate surface is substituted by IPA; thereafter, while the glass substrate is exposed to IPA vapor, IPA is vaporized and thereby the glass substrate is dried. Thereafter, as necessary, the glass substrate is inspected. The glass substrate may be dried otherwise than just described; it may be dried by any conventionally known method as one for drying a glass substrate, such as spin drying and air-knife drying.

Next, the glass substrate is subjected to texturing. In the texturing here, stripes in the shape of concentric circles are formed on the glass substrate surface by polishing using tape. Texturing gives a magnetic disk medium magnetic anisotropy; this improves the magnetic characteristics thereof as a magnetic disk, and also prevents attraction between a magnetic head and the surface of the magnetic disk when a hard disk drive is out of operation.

Here, a texturing liquid is used that has abrasive particles dispersed evenly in a liquid in a way that the abrasive particles do not precipitate while the liquid is in storage; specifically, used as such a texturing liquid is a slurry having about 0.01% to 5% by weight of abrasive particles dispersed in a water solution containing about 1% to 25% by weight of a glycol compound surfactant such as polyethylene glycol or polypropylene glycol.

An example of the abrasive particles is monocrystalline or polycrystalline diamond particles. Diamond particles have a regular particles shape, have a uniform particle size and shape, are hard, and are excellently resistant to chemicals and heat. In particular, polycrystalline diamond particles have, compared with monocrystalline counterparts, a more round particle shape, with rounded corners, and are widely used as abrasive particles for ultraprecision polishing.

It is preferable that, after texturing, the topmost surface of the glass substrate have a surface roughness Ra of 0.3 nm or less. In the magnetic disk as an end product, a surface roughness Ra larger than 0.3 nm here makes it impossible to reduce the distance between a magnetic head and the surface of the magnetic disk, and thus to increase the recording capacity of the magnetic disk.

Next, on the glass substrate fabricated as described above, a magnetic film is formed. The magnetic film can be formed by a conventionally known method, for example, by spin-coating the substrate with a thermosetting resin having magnetic particles dispersed therein, by sputtering, or by electroless plating. Spin-coating provides a film thickness of about 0.3 µm to 1.2 µm, sputtering provides a film thickness of about 0.04 µm to 0.08 µm, and electroless plating provides a film thickness of about 0.05 µm to 0.1 µm. To reduce the film thickness and to obtain a high density, it is preferable to adopt sputtering or electroless plating.

There is no particular restriction on the material of the magnetic film; it may be any conventionally known magnetic material. To obtain a high coercivity, it is suitable to use, for example, an alloy of Co that is based on Co, having high crystal anisotropy, and that has Ni or Cr added thereto to adjust the residual flux density. Specifically, examples of such magnetic materials containing Co as a main ingredient thereof include: CoPt, CoCr, CoNi, CoNiCr, CoCrTa, CoPtCr, CoNiPt, CoNiCrPt, CoNiCrTa, CoCrPtTa, CoCrPtB, and CoCrPtSiO. To reduce noise, the magnetic film may be divided with a non-magnetic film (e.g., Cr, CrMo, or CrV) to have a multiple-layer structure (e.g., CoPtCr/CrMo/CoPtCr, CoCrPtTa/CrMo/CoCrPtTa). Other than the magnetic materials mentioned above, it is also possible to use: a ferrite material; an iron-rare earth metal material; or a granular material having magnetic particles of Fe, Co, FeCo, CoNiPt, or the like dispersed in a non-magnetic film of SiO$_2$, BN, or the like. The magnetic film may be for either of the longitudinal and perpendicular types of recording.

For smoother sliding of a magnetic head, a thin coat of a lubricant may be applied to the surface of the magnetic film. An example of the lubricant is perfluoropolyether (PFPE), a liquid lubricant, diluted with a solvent of the Freon family or the like.

As necessary, an underlayer or a protective layer may additionally be provided. In a magnetic disk, what underlayer to provide is determined to suit the magnetic film. The material of the underlayer is, for example, one or more selected from the group of non-magnetic metals including Cr, Mo, Ta, Ti, W, V, B, Al, and Ni. With a magnetic film containing Co as a main ingredient thereof, it is preferable to use the simple substance of or an alloy of Cr. The underlayer is not limited to one having a single layer, but may be one having a multiple-layer structure having a plurality of layers of the same material or of different materials laid on one another. Examples of multiple-layer underlayers include: Cr/Cr, Cr/CrMo, Cr/CrV, NiAl/Cr, NiAl/CrMo, and NiAl/CrV.

Examples of protective layers for preventing wear and corrosion of the magnetic film include: a Cr layer, a Cr alloy layer, a carbon layer, a carbon hydride layer, a zirconia layer, and a silica layer. Any of these protective layers can be formed continuously with the underlayer, the magnetic film, etc. on in-line sputtering equipment. Any of those protective layers may be provided in a single layer, or more than one of them, of the same material or of different material, may be provided in multiple layers. In addition to, or instead of, this or these protective layers, another protective layer may be formed. For example, instead of the above protective layers, a silicon dioxide ($SiO_2$) layer may be formed by applying to the top of the Cr layer minute particles of colloidal silica dispersed in tetraalkoxysilane diluted with a solvent of the alcohol family and then baking the applied layer.

What is claimed is:

1. A method for fabricating a glass substrate comprising:
   polishing a glass substrate with an abrasive;
   cleaning the polished glass substrate to remove at least a portion of the abrasive adhered to the glass substrate;
   wherein cleaning the polished glass substrate comprises:
      providing a first type of cleaning liquid having a Si element eluation in the range of 1 to 10,000 ppb/mm$^2$, and being capable of eluting Si element from the glass substrate;
      providing a non-liquid physical scrubbing element;
      applying the first type of cleaning liquid to the glass substrate and to the non-liquid physical scrubbing element;
      frictionally scrubbing the glass substrate with the non-liquid physical scrubbing element using the first type of cleaning liquid;
      providing a second type of cleaning liquid having a Si element eluation in the range of 0.001 to 10 ppb/mm$^2$, and being capable of eluting Si element from the glass substrate, wherein the first type of cleaning liquid has a higher Si element elution than the second type of cleaning liquid, and the first and second types of cleaning liquids contain substantially a same cleaning liquid ingredient but in different concentrations and are used in order of decreasing order concentration;
      applying the second type of cleaning liquid to the glass substrate and to the same non-liquid physical scrubbing element; and
      frictionally scrubbing the glass substrate with the non-liquid physical scrubbing element using the second type of cleaning liquid, wherein the frictionally scrubbing using the first type of cleaning liquid followed by the frictionally scrubbing using the second type of cleaning liquid is performed on a continuous basis using a single cleaning machine so that there is no interruption in the scrubbing process.

2. The method according to claim 1, wherein the non-liquid physical scrubbing element is a brush, pad, or sponge roller.

3. The method according to claim 1, wherein the cleaning liquid is hydrofluoric acid.

4. The method according to claim 1, wherein among the first and second types of cleaning liquids, one used first has a lower specific resistance than one used last.

* * * * *